United States Patent [19]

Brandt

[11] Patent Number: 4,521,468
[45] Date of Patent: Jun. 4, 1985

[54] DEFORMABLE PAD FOR TREE CLAMPING JAWS

[75] Inventor: Richard W. Brandt, Yuba City, Calif.

[73] Assignee: Orchard Machinery Corporation, Yuba City, Calif.

[21] Appl. No.: 572,675

[22] Filed: Jan. 19, 1984

[51] Int. Cl.³ .............................................. B32B 1/02
[52] U.S. Cl. ................. 428/35; 56/328 TS; 428/76
[58] Field of Search .............. 428/364, 368, 372, 373, 428/374, 378, 229, 76, 35; 56/328 TS

[56] References Cited

U.S. PATENT DOCUMENTS

| 2,849,415 | 8/1958 | Stott | 260/37 |
| 2,855,377 | 10/1958 | Stott | 260/37 |
| 3,318,629 | 5/1967 | Brandt, Jr. | 294/103 |
| 3,335,556 | 8/1967 | Edgemond, Jr. | 56/328 |
| 4,370,375 | 1/1983 | Bond | 428/229 |

Primary Examiner—Paul J. Thibodeau

[57] ABSTRACT

A lubricated, abrasion-resistant filler for the bark-protective deformable pads of tree shaker clamping jaws comprises small, jagged-edged chips of a high impact strength, low heat-transfer polymer, such as nylon 66, impregnated with a dry, high-melting temperature lubricant, such as molybdenum disulfide. The chips provide increased wear resistance due to less heat buildup from friction. By interlocking, the chips maintain a direct transfer of pressure to the tree from the vibrating jaws without slippage.

15 Claims, 4 Drawing Figures

DEFORMABLE PAD FOR TREE CLAMPING JAWS

DESCRIPTION

1. Technical Field

The invention relates to improvements in tree shaker clamping jaws with bark protective deformable pads filled with granular material and in particular to a lubricated abrasion-resistant filler for such pads.

2. Background Art

Mechanical tree shakers are used in harvesting crops such as fruit or nuts by encircling the tree trunk with padded jaws and vibrating the tree trunk to release the fruit. These jaws operate at high speeds which would cause destructive wearing of the bark without a protective pad to cushion the contact of the jaws on the trunk and distribute the force around the circumference of the trunk. Solid pads of a compressible material containing air pockets have been used in the past to provide for deformation of the pad to fit the tree trunk during the shaking.

A pad formed of a deformable container containing granular material which allows the container to be squeezed into a conforming position around a tree trunk by pressure of the jaws is disclosed in U.S. Pat. No. 3,318,629. The granular material may be coarse sand, metal particles, or plastic bits. Air or other fluid is used to loosen up compacted material after each use. It is desirable to minimize hydrostatic pressure within the pad which tends to rupture the pad. Previously, material such as broken walnut shell pieces were also used as a deformable hard material in the pads. These irregularly shaped pieces interlock when pressed firmly against the surface and transmit the applied forces directly to that surface contacted rather than sideways or backwards to the container walls. However, due to the large forces transferred to the pad during the tree shaking by machines in current use, considerable friction and heat develops inside the pad. Transfer of this heat to materials such as walnut shells can cause the shells to burn, resulting in the buildup of gases. The use of unlubricated plastic bits as a filler is not desirable since the heat buildup from friction causes melting of the plastic and a resultant formation of large lumps or solid masses of the filler material.

It is known from the prior art that high-melting polymers such as nylon could be blended with dry lubricants, such as graphite and molybdenum disulphide, to achieve anti-friction materials for bearings, gear parts, and bushings. This impregnated polymer has increased wear resistance. U.S. Pat. No. 2,849,415 discloses a method for impregnating nylon with between 10 and 90 percent molybdenum disulfide to achieve a high strength article, such as bearings, having self-lubricating properties and reduced thermal expansion with less tendency to size thereby allowing the bearings to be made to closer tolerances than those of articles molded of nylon alone. U.S. Pat. No. 2,855,377 discloses the incorporation of about 2% molybdenum disulfide in nylon for use in machine parts such as bearings and gears to decrease the high coefficient of thermal expansion of nylon, thereby allowing nylon bearings, gears and other machine parts to be molded or cast into closer tolerances without binding or seizing when the parts become heated by friction during use. U.S. Pat. No. 4,370,375 discloses an abrasion-resistant monofilament with molybdenum disulfide useful in the formation of paper-making belts with resistance to abrasive forces applied transversely to the length of the monofilament.

A deformable pad for the clamping jaws of the tree shaker must conform to irregular tree trunk shapes, therefore a one-piece pad molded from the nylon and molybdenum disulfide dispersion would not be satisfactory. Flexible monofilaments of this material would be hard to pack into a deformable pad container having limited access ports.

It is therefore the object of the invention to devise a suitable pressure transferring filler material which can be easily poured into a deformable pad container, which would lessen heat buildup from friction forces, and which would cause the pad to be readily deformable directly at the point of contact with the tree trunk.

DISCLOSURE OF THE INVENTION

The above object has been achieved by a pressure transferring pad filler material comprising small rods of a high impact strength polymer impregnated with a dry, high-melting temperature lubricant. A material consisting of a high-melting temperature polyamide such as nylon 66, polyhexamethylene adipamide, impregnated with about 2% of the dry metal lubricant, molybdenum disulfide, is formed into thin rods and cut into short lengths. Large cylindrically-shaped molded containers of nylon cord and elastomer are filled with the nylon/molybdenum disulfide rods. These filled pads are then inserted into slings attached to the tree-shaking jaws. The filled pads readily deform to fit any shape of tree and are able to withstand large forces without melting or burning. Less friction is developed between the rods rubbing on each other because of the presence of molybdenum disulfide lubricant. The lubricant is dry and does not cause a buildup of hydrostatic pressure such as would be caused by fluid lubricants. The small size of the rods, on the order of a few millimeters, provides increased surface area for interacting contact and transmits the pressure of the jaws directly to the trunk thereby allowing the tree shaker to vibrate the tree at a high frequency without damage to the bark while maintaining pressure at the contacted surface without slippage. The small size of the rods also allows filling to about 95% of the enclosed area in the pad container. The lubricating action of the molybdenum disulfide in the rods prevents clumping of material in the pad after each clamping operation.

In an alternative embodiment the pad filler material may comprise elliptically shaped chips.

BEST MODE FOR CARRYING OUT THE INVENTION

Figure 1:
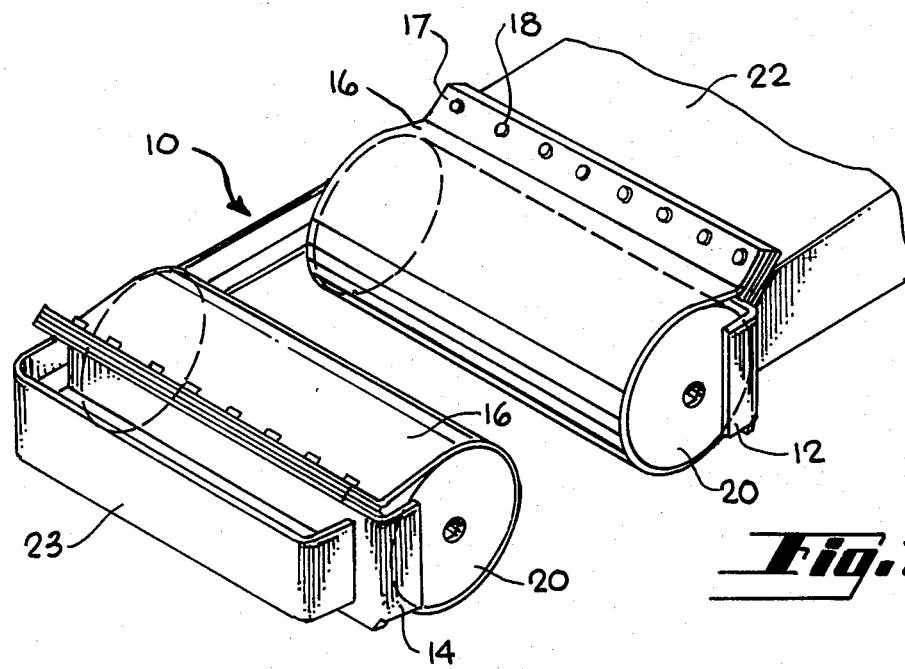
FIG. 1 is a perspective view of tree clamping jaws using deformable pads containing the filler material of the present invention.

With reference to FIG. 1 a representative type of tree clamping jaws 10 of a tree shaker is shown using deformable pads 20 which contain the pressure transfer filler material of the present invention. Stationary jaw 12 and movable jaw 14 carry flexible supports 16 which enclose the deformable pads. Such supports are commonly made out of belting and are attached to the upper edges of the jaws by a metal strip 17 which is attached to the jaws by means of screws or other suitable fastening means 18. The deformable pads 20 are carried in the flexible support in a sling fashion. The jaws are attached to a vibrating mechanism in the housing 22. Vibrating force is transmitted directly to stationary jaw 12 and, by means of brace 23, to movable jaw 14. In use, the jaws encircle the trunk and the movable jaw is brought into gripping contact with the tree trunk and the pressure is increased against the trunk until the pads conform to the shape of the trunk and the force of the clamping pressure is transferred from the jaw directly by the packing material to that portion of the pad contacting the tree trunk. Vibrating forces are then applied through the jaws to the tree trunk which is held firmly in the protective pads of the jaws without damage to the tree trunk or bark.

Figure 2:
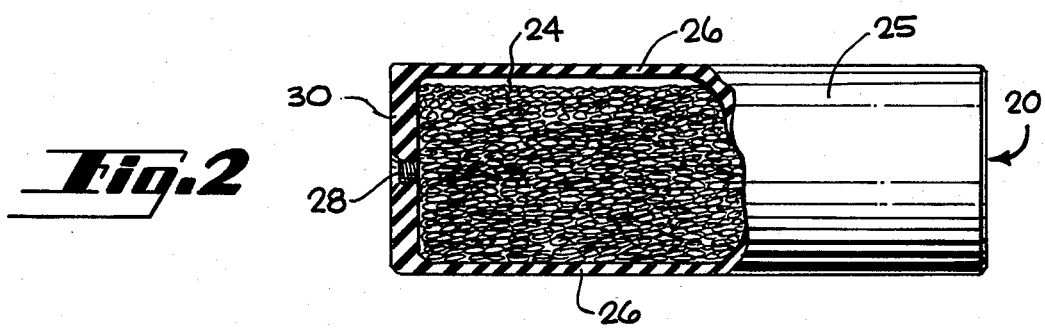
FIG. 2 is a partial cross-sectional side view of a deformable pad container packed with rods of the present invention.

FIG. 2 shows the pressure transferring rods of the preferred embodiment of present invention within the deformable pad container 25. The side walls 26 of the container are made from 2-ply nylon cord woven into a molded resilient elastomer, and are about one-fourth inch thick. A metal fitting 28 is molded into one end wall of the deformable container. The metal fitting is approximately one inch in diameter. The end walls 30 of the container are about one-half inch thick. The metal fitting is used to fill the container with the abrasion-resistant rods 24. The container is filled to approximately 95% of its capacity with the rods.

Figure 3:
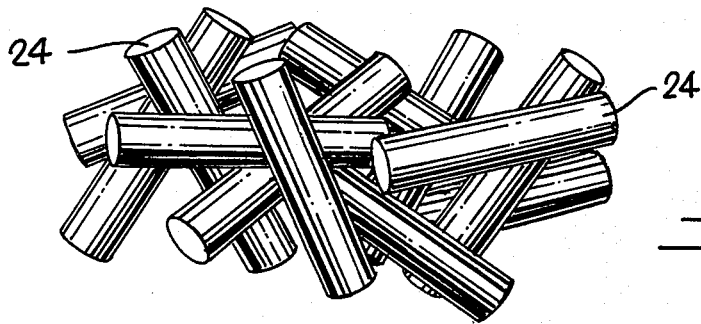
FIG. 3 is a perspective view of the rods of the preferred embodiment of the present invention.

The rods 24, shown in FIG. 3, are composed of a high abrasion-resisting polymer such as nylon 66 impregnated with a dry high-melting temperature lubricant such as molybdenum disulfide. The two materials are mechanically mixed and then the nylon material is melted and extruded and sliced into small rods. The rods may be 1-2 mm. in diameter and 3-4 mm. in length, preferably less than 3 mm. in diameter and 5 mm in length, and the pad container is easily filled through a small porthole approximately one inch in diameter. Due to the impregnated molybdenum disulfide, the nylon has a decreased capacity to generate the heat which develops during the high frequency vibration of the tree trunk. The molybdenum disulfide lubricant lowers the amount of friction developed between the rods rubbing on each other. The size of the rods allows easy filling and emptying of the pad when necessary. Experience with the nylon/molybdenum disulfide rods indicates that the service time of the deformable pads is extended without failure during service with this packing since there is low buildup of heat and gases.

FIG. 3 shows the close packing possible with the rods 24 of the preferred embodiment and the large area of contacting surfaces to dissipate the heat while pressure is applied to the trunk through the pad. The small rods are readily shifted in the pad upon compression against the tree trunk to conform to any irrregular shape affording a close contact around the trunk. Upon further pressure the rods transfer the pressure directly from the jaws to the contacted surfaces of the trunk. Vibrational forces are then applied to the trunk through the protective pad which is clamped to the trunk in a non-slipping locked-in position.

Figure 4:
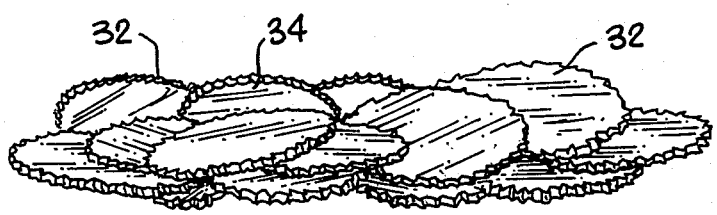
FIG. 4 is a perspective view of the elliptically-shaped filler material of the alternative embodiment.

FIG. 4 shows an alternative embodiment of the filler material. The mixture of molybdenum disulfide and nylon 66 is melted and extruded as a larger diameter rod which may have jagged surface edges 32. These rods are then sliced into elliptically shaped chips 34 of a size approximately 6 mm. long and 3 mm in diameter. These irregularly shaped chips may tend to interlock with each other upon compression and the will transfer the gripping force directly between the jaw and the tree trunk without sideways slipping within the deformable pad. The rough edges increase the surface area having a lubricant, somewhat lessening the tendency to interlock.

Although in the preferred embodiment the rods are formed of nylon 66 impregnated with molybdenum disulfide, alternate embodiments are possible using high impact strength, high abrasion resistant polymer rods containing dry, high melting temperature lubricants. These qualities present in the form of small irregular shaped rods or chips would provide the necessary protective, force transferring, heat and pressure stable filler material for the deformable pads of the tree clamping jaws.

I claim:

1. A deformable pad for clamping jaws of a tree shaking machine comprising,
   a bark protective, resilient container means for cushioning a tree mounted in a jaw support of a tree shaking machine, said container means having a fitting disposed therein forming an exterior porthole opening to a central cavity, said central cavity more than 90% filled with high abrasion resistant polymer rods impregnated with a dry, high-melting temperature lubricant, said rods having dimensions in the range of one to seven millimeters.

2. The pad of claim 1 wherein said polymer rods are nylon 66 impregnated with molybdenum disulfide.

3. A pad for clamping jaws of a tree shaking machine comprising,
   a bark protective, resilient container means for cushioning a tree mounted in a jaw support of a tree shaking machine, said container means having a fitting therein forming an exterior porthole opening to a central cavity, said central cavity more than 90% filled with abrasion resistant, high tensile strength polymer rods impregnated with a dry, high melting temperature lubricant, said rods having dimensions in the range of one to seven millimeters.

4. The pad of claim 3 wherein said abrasion-resistant polymer is a polyamide.

5. The pad of claim 3 wherein the lubricant is molybdenum disulfide.

6. The pad of claim 3 wherein the polymer is nylon 66.

7. The pad of claim 3 wherein said rods are elliptically-shaped flat segments having jagged edges.

8. A bark protective deformable pad for clamping jaws of a tree shaking machine comprising,
   a bark protective, resilient container means for cushioning a tree mounted in a jaw support of a tree shaking machine, said container means having a fitting therein forming an exterior porthole opening to a central cavity, said central cavity more than 90% filled with thin, short-length nylon rods impregnated with molybdenum disulfide, said rods having dimensions in the range of one to seven millimeters.

9. The pad of claim 8 wherein said rods have a length less than 5 mm. and a width less than 3 mm.

10. A bark protective deformable pad for clamping jaws of a tree shaking machine comprising, a bark protective, resilient container means for cushioning a tree mounted in a jaw support of a tree shaking machine, said container means having a fitting therein forming an exterior porthole opening to a central cavity, said central cavity more than 90% filled with chips of an abrasion resistant, low-thermal conductivity high-tensile strength polymer impregnated with a dry high-melting temperature lubricant, said chips having a flattened shape with dimensions of one to seven millimeters.

11. The pad of claim 10 wherein said abrasion-resistant polymer is a polyamide.

12. The pad of claim 10 wherein the lubricant is molybdenum disulfide.

13. The pad of claim 10 wherein the polymer is nylon 66.

14. The pad of claim 10 wherein said polymer chips are of an irregular shape having a largest dimension less than 7 mm.

15. The pad of claim 10 wherein said chips are elliptically-shaped flat segments having jagged edges.

* * * * *